Oct. 5, 1965 K. G. HOER 3,210,467

PHOTO-TELEGRAPHIC APPARATUS

Filed Feb. 15, 1963 5 Sheets-Sheet 1

Oct. 5, 1965 K. G. HOER 3,210,467

PHOTO-TELEGRAPHIC APPARATUS

Filed Feb. 15, 1963 5 Sheets-Sheet 2

Oct. 5, 1965

K. G. HOER 3,210,467

PHOTO-TELEGRAPHIC APPARATUS

Filed Feb. 15, 1963

5 Sheets-Sheet 3

United States Patent Office 3,210,467

Patented Oct. 5, 1965

3,210,467
PHOTO-TELEGRAPHIC APPARATUS

Kenneth George Hoer, Beckenham, Kent, England, assignor to Muirhead & Co. Limited, Kent, England Filed Feb. 15, 1963, Ser. No. 258,739
Claims priority, application Great Britain, Mar. 12, 1962, 9,447/62
15 Claims. (Cl. 178—7.4)

This invention relates to photo-telegraphic transmitting and receiving apparatus and in particular to apparatus involving the continuous scanning process.

A common and much used system of this kind employs at the transmitter a rotatable drum carrying on its peripheral surface the message to be transmitted which, for example, may be a photograph.

The drum is rotated at constant speed at the same time as a pencil of light traverses the drum in a lengthwise direction.

Thus, in a given period of time, depending on the speed of the drum and the rate of traverse of the exploring spot of light impinging on the drum, the picture to be transmitted is progressively illuminated in the form of a close spiral. The varying intensity of light reflected from the picture surface is collected in an optical system and projected on to the sensitive element of a photoelectric device whereby the light signal is converted into a corresponding electrical signal which can be adapted for transmission over any of the recognised transmission systems, e.g., radio, line or cable. The receiver comprises a similar system of rotating drum and traversing means with provision for rotating the drum at the same speed as the transmitter drum and in angular phase therewith. The receiver drum carries on its peripheral surface a sheet of light sensitive paper or film, and a source of illumination is carried by the traversing means. By means of a suitable optical system, the light is focussed onto the photo-sensitive material on the drum whereby progressively "exposing" it in a photographic sense. The incoming signal is arranged, by means well known to those versed in the art, to control the intensity of the light source in strict accordance with the varying light intensity reflected from the picture at the transmitter and thus, the original picture is reproduced at the receiver.

In most of the known photo-telegraphic systems, the scanning rate is relatively slow, so that a considerable lapse of time occurs between the commencement and the completion of a single picture transmission, involving considerable expense in rental of the transmission link.

In order to use the transmission link to the greatest economic advantage, it is desirable to reduce the transmitting time of the picture and one method of achieving this end is by a corresponding increase in drum speed. With sufficiently high drum speed, it is also possible, at the expense of slightly increased transmission time, to increase the scanning rate, i.e., lines per inch, thereby improving definition.

By way of comparison, it is common to operate present photo-telegraphic systems with a drum speed of 60 r.p.m. and a scanning rate of 100 lines per inch, resulting in a rate of recording of 0.6 inch/minute. If the drum speed is increased to say 3600 r.p.m. it is apparent that the rate of recording has been increased to 36 inches/minute. Now, if higher definition is required, the scanning rate may be increased to say 1000 lines per inch giving an improvement in definition of ten times. Under these conditions the rate of recording would be 3.6 inches/minute, which is six times greater than with the low speed system postulated above.

The present invention relates to improvements in photo-telegraphic apparatus whereby high rates of recording accompanied by greater resolution of the transmitted material may be achieved in a commercially practical manner.

In known photo-telegraphic receivers it is common to provide for the removal of the drum so that it may be loaded with photographic material in a darkroom. This involves disengaging the drum from its supporting bearings. A commonly adopted method of doing this is to mount the drum in pivot bearings one of which may be retracted for removing the drum. However, in approaching the problem of a high speed drum it has been found that pivotal support of the drum is unsatisfactory on account of excessive friction and consequent wear of the pivots and their corresponding conical bearings.

According to the invention there is provided a construction wherein the complete driving mechanism comprising the driving motor, the means of transmitting the motor power to the drum shaft and the drum itself form a sub-assembly detachable from the body of the machine as a single and complete unit.

It will be seen that with this arrangement the drum bearings are not disturbed, and forms of bearing more suited to high speed rotation may be freely employed. In particular, the invention involves the use of an air bearing in which the shaft co-operates with a plain journal, and metallic contact between the two parts is prevented by air pressure so that bearing friction is virtually eliminated.

It will be apparent to those skilled in the art that in high speed facsimile systems and, in particular those involving high scanning rates, the mechanical tolerance of the rotational and traversing mechanisms must be of a very high order, which it has been found impossible to achieve by methods commonly used in low speed systems. The system which is the subject of this invention has been found to meet all the requirements of high speed photo-telegraphic transmission and in a specific equipment embodying the invention excellent reproduction has been achieved at drum speeds exceeding 3000 r.p.m. and a scanning rate of 1000 lines/inch.

Furthermore, it has been found that the cost of construction is considerably less than in former constructions involving the use of retractable pivot bearings.

In order that the invention may be more clearly understood, an embodiment thereof will now be described by way of example with reference to the accompanying drawings, in which like characters refer to like parts throughout the several figures thereof.

The drawings relate to a form of construction for a facsimile apparatus commonly employed in present-day practice.

A drum, adapted for rotation, and the requisite driving mechanism, are mounted on a fabricated or cast metal base. An optical scanning system is mounted on a track adjacent the drum in such a manner that the optical system may be traversed parallel to the axis of the drum by suitable propelling means. Ancillary means are provided for starting and stopping the drum and ensuring that it runs in proper phase relationship with the drum of a co-operating facsimile machine.

In the kind of facsimile apparatus described, in which the message is recorded at the receiver on light-sensitive material, e.g. photographic film in the case of "negative" reception, and photographic printing paper in the case of "positive" reception, the drum carrying the light-sensitive material is contained within a light-tight enclosure with provision for the optical scanning means, which is external to the enclosure, to scan the drum and the light-sensitive material thereon without the ingress of light from other sources.

Figure 1:
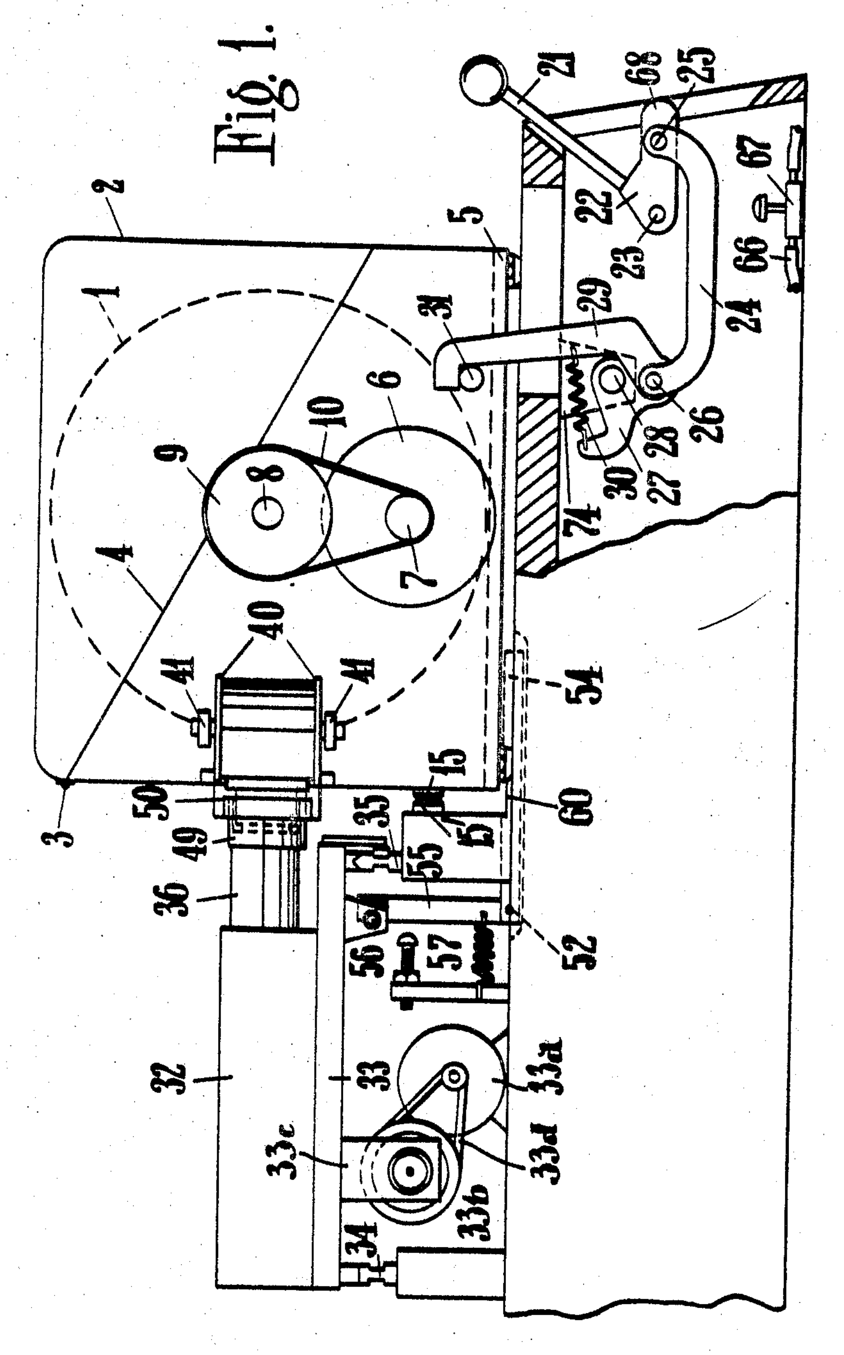
FIGURE 1 is an end view, partly in section, of a facsimile receiver embodying a preferred form of the invention.
Figure 2:
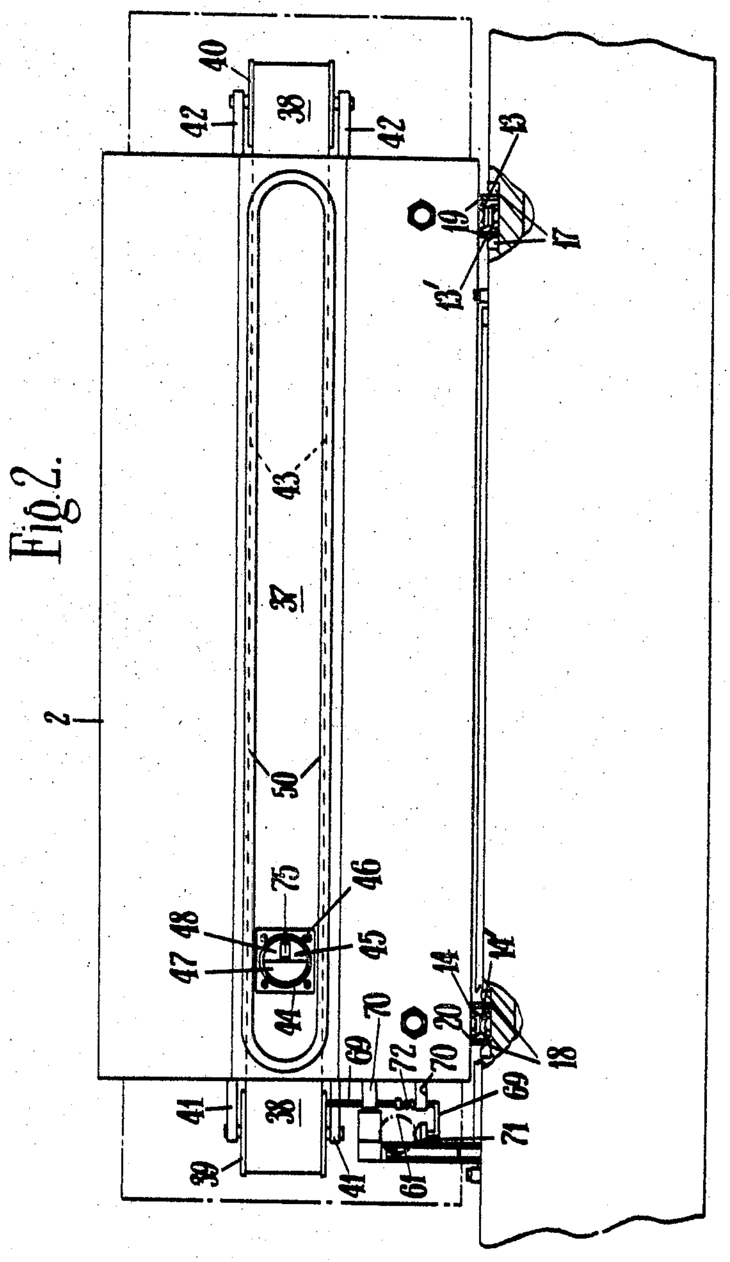
FIGURE 2 is a view in side elevation of the facsimile receiver shown in FIGURE 1.

Referring now to FIGURES 1 and 2, showing only the parts of a facsimile receiver relevant to the invention, a message drum, represented by the broken circle 1, is contained in a light-tight enclosure 2. The enclosure 2 is in two parts hinged at 3 and is openable along the line 4 for the purpose of loading the light-sensitive material onto drum 1. In the present embodiment the shaft 8 of drum 1 is mounted at each end in journal bearings 8_a_ of known kind in which pressurized air supplied by pipes 8_b_ is applied between the shaft and the journal so that the shaft, carrying the drum, effectively rides on a cushion of air thereby practically eliminating frictional losses in the bearing. A synchronous electric motor 6 mounted on an extension of the base plate 5 of enclosure 2, carries a pulley 7 which drives the drum shaft 8 by means of a pulley 9 and a flexible belt 10. Conveniently, the belt may carry serrations on its driving surface which engage corresponding serrations in pulleys 7 and 9 thereby to eliminate slip between the belt and the pulleys. It must be understood that other forms of drive, for example, direct drive or through a train of gears may be employed within the scope of the invention.

Figure 3:
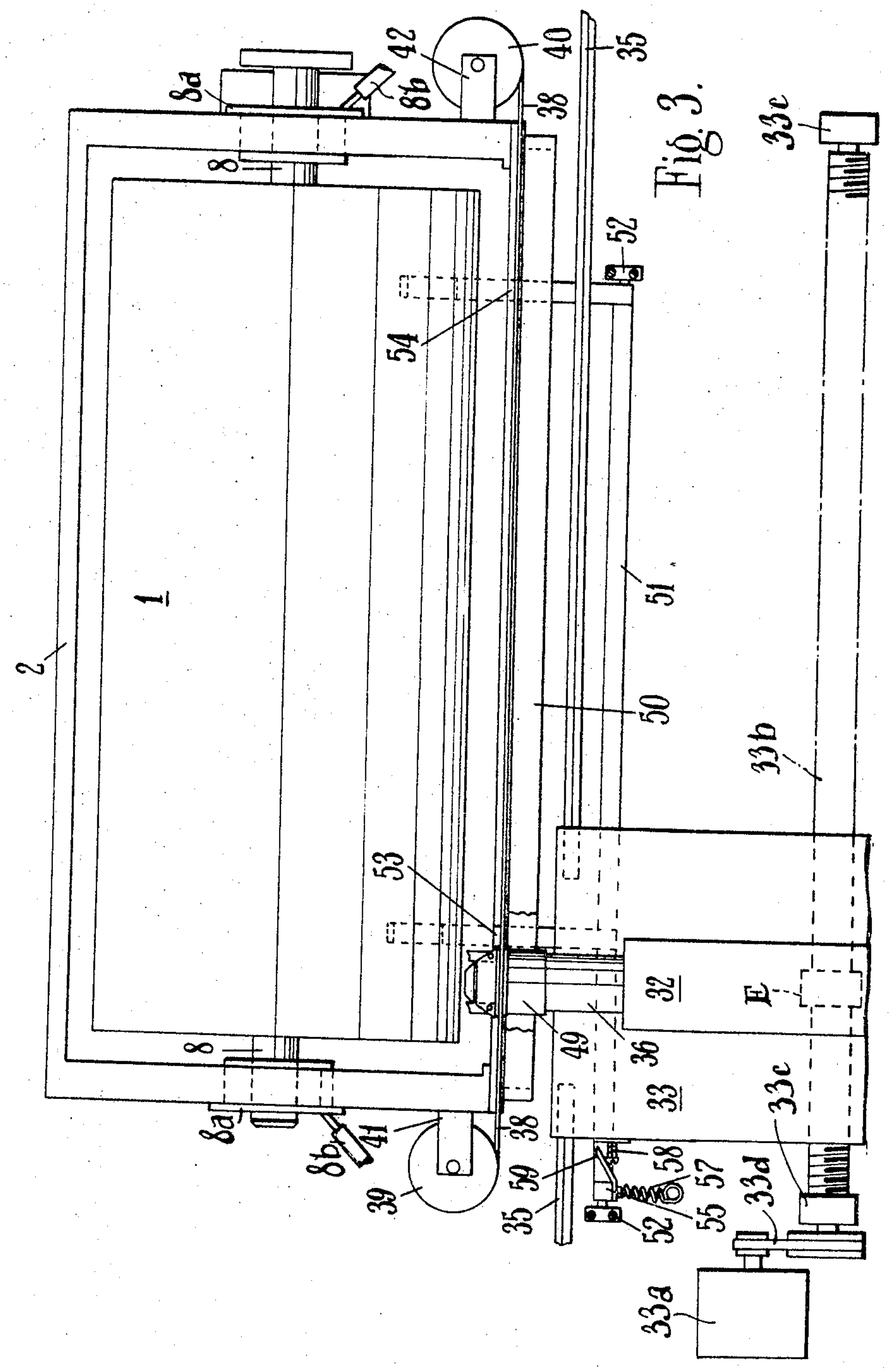
FIGURE 3 is a plan view of the facsimile receiver of FIGURES 1 and 2.
Figure 9:
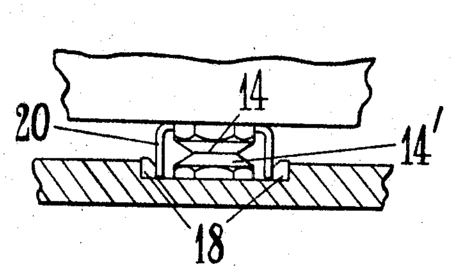
FIGURE 9 is an enlarged drawing of a guiding device.

As has been indicated above it is a feature of the invention to be able to remove the drum and driving mechanism from the main body of the facsimile machine to facilitate loading the drum with light-sensitive material. It is, of course, essential that the drum and drive assembly shall register exactly at fixed points on the main assembly each time it is returned thereto. To achieve this end, buffers are provided at certain points on the drum and drive assembly which engage corresponding stops on the main assembly and a lever operated device performs the double action of drawing the drum and drive assembly into its final position and locking it therein. In the particular embodiment of the invention shown in the drawings, six pairs of buffers and stops are provided, four being located beneath and two at the rear face of the drum and drive assembly, as indicated in schematic diagram (FIGURE 8), and designated 11 to 14 and 15, 16 respectively. In FIGURES 1, 2 and 3 the buffers, where shown, are, for convenience, designated by like numerals and the stops by like numerals primed. The stops 11' to 14' are located in chamfered grooves 17 and 18 respectively in the main assembly. Similarly, buffers 11 to 14 are located on the under side of the drum and drive unit in inverted U-shaped channels 19 and 20 (see FIGURES 2 and 9) respectively which conveniently may be made of nylon so to form runners for the drum and drive unit. Thus, it will be apparent that to mount the drum and drive unit, the rear face of the unit must be presented to the front face of the main assembly so that the nylon runners 19 and 20 engage the chamfered grooves 17 and 18 and pushed steadily forward until the buffers 15 and 16 abut stops 15' and 16' respectively. In this position, buffers 11 to 14 will abut stops 11' to 14' respectively and the drum and drive assembly will be correctly positioned on the main assembly.

Figures 4, 5, 6:
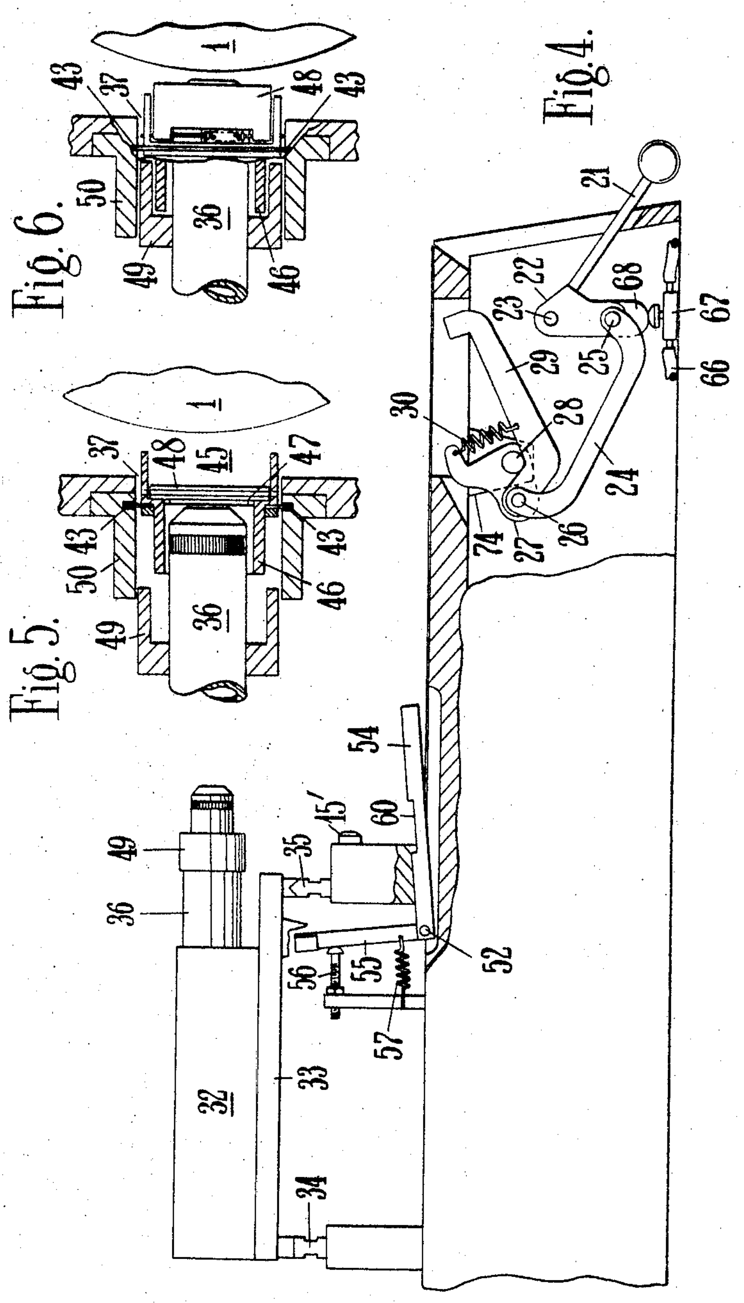
FIGURE 4 is an end view, partly in section, of the facsimile receiver of FIGURES 1 to 2 with the drum and associated parts removed.
FIGURE 5 is a detail view, in section, of a facsimile receiver showing details of a movable light-weight device.
FIGURE 6 shows the device of FIGURE 5 in the operated position.

Raising a lever 21 from the position shown in FIGURE 4 to the position shown in FIGURE 1 will effectively draw the drum and drive unit into intimate contact with the stops by a combined action which first draws buffers 15 and 16 into contact with stops 15' and 16' by a rearwards movement and then buffers 11 to 14 into contact with stops 11' to 14' respectively by a downwards movement.

In FIGURE 4, lever 21 with an extension 22 is shown pivoted to the main assembly at 23. Extension 22 is pivoted at 25 to link 24 and the further extremity of link 24 is pivoted to a toggle 27 at 26. Toggle 27 is rigidly attached to one end of rod 28 carried in a bearing 74. Locking lever 29 is pivoted to toggle 27 at 26 and an elbow formed in locking lever 29 is held in engagement with an extension of rod 28 by spring 30 which further links it resiliently with toggle 27. It will be seen from the drawings that the extension of rod 28 forms a fulcrum upon which locking lever 29 may turn.

Thus, when lever 21 is first moved upwardly from the position shown in FIGURE 4, link 24 will impart a downwards movement to pivot 26 thereby causing locking lever 29 to pivot about fulcrum 28. Toggle 27, also being pivoted at 26 performs a like motion thereby turning rod 28 to which it is attached.

Continued upwards movement of lever 21 will eventually cause locking lever 29 to assume the position shown in FIGURE 1, it being now restrained from further turning motion by pin 31. Further upwards movement of lever 21 will cause spring 30 to extend, due to continued rotation of toggle 27, thereby urging the drum and drive unit into its final position.

It will also be apparent that continued movement of lever 21 to its final position as shown in FIGURE 1 will cause locking lever 29 to be raised from fulcrum 28 and the resulting downwards pressure of locking lever 29 ensures that the drum and drive unit is held in intimate contact with stops 11' to 14'.

Rod 28 extends to the other end of the drum and drive unit and parts 27, 29, 30, and 74 are repeated thereat to comprise a similar locking device actuated by rod 28.

The optical scanning means, insofar as it is relevant to the present invention, is shown generally at 32 in FIGURES 1, 3 and 4. It is mounted, as shown, on platform 33 which travels in a direction parallel to the axis of the drum, on guide rails 34 and 35. The driving means for the optical scanning system comprises a motor 33_a_ which drives a lead screw 33_b_ mounted in bearing 33_c_ by means of a belt 33_d_. The lead screw co-operates with a nut E mounted beneath the platform 33. The focussing tube 36 extends forward towards a slot 37 in the light-tight container 2 which extends substantially the length of the container. Slot 37 is continuously surrounded by hood 50. The slot 37 is closed by an opaque flexible band or blind 38 the ends of which are wound round drums 39 and 40 adapted for rotation in bearings 41 and 42 respectively. The bind 38 runs in horizontal grooves 43 indicated by broken lines in FIGURE 2 and in section in FIGURES 5 and 6 thereby to form a light seal. Blind 38 carries an attachment 44 comprising a circular aperture 45 surrounded by hood 46 (FIGURES 5 and 6) which, when the drum and drive unit is removed from the machine is closed by overlapping sprung flaps 47 and 48 to exclude light from the interior of the light tight container 2. On the other hand, when the drum and drive unit is fitted to the machine for focussing tube 36 of optical scanning means 32 forces the flaps 47 and 48 to open as shown in FIGURE 6 so that the object lens is at the correct focal distance from drum 1. A raised portion 75 on flap 48 which first makes contact with focussing tube 36 ensures that flap 48 opens first and closes last. In order to prevent ingress of extraneous light while the focussing tube 36 is taking up its working position, the following preventative means are taken. As the drum and drive unit is being slid into position on the main assembly, a cup-shaped part 49 attached to focussing tube 36 (FIGURES 5 and 6) first enters the hood 50 and, subsequently, covers the hood 46, as shown in FIGURE 5. Thus, a light seal is formed prior to the opening of flaps 47 and 48 as shown in FIGURE 6. It will now be clear that as the optical scanning means 32 traverses, the motion will be transmitted via the focussing tube 36 to the blind 37 which, in its travel will wind off one of the drums 39 or 40 and onto the other according to the direction of traverse. Each of the drums 39 and 40 is spring loaded internally in opposite directions so that the opposing torques tend to stretch the blind and prevent kinking and buckling.

It is a feature of the invention that means are provided to ensure that the drum and drive unit can only be fitted to and removed from the main assembly when the optical unit 32 is in the "start" position i.e. at one end of the traverse (FIGURE 3) and that in this condition the aperture 45 in blind 38 is in correct alignment with the focussing tube 36. These means will now be described.

An operating rod 51 (see FIGURES 3 and 4) is mounted for rotation in bearings 52. Locking arms 53 and 54 and an operating lever 55 are rigidly attached to operating rod 51, as shown in the drawings. Operating rod 51, is biased in the direction of stop pin 56 by spring 57 so that the locking arms are in the position shown in FIGURE 4, which is the condition when the drum and drive unit is removed and the optical scanning unit 32 is in a position away from the "start" position. Referring now to FIGURE 3, the optical scanning unit has been traversed back to the "start" position when, by this action, a thrust pin 58 on optical scanning unit 32 presses on an inclined plane 59 forming the top portion of operating lever 55 causing the latter to move forward away from stop pin 56 and causing locking arms 53 and 54 to sink into grooves in the main assembly, as indicated in FIGURE 1. The drum and drive unit may now be placed in position without being obstructed by locking arms 53 and 54. When in position, lugs (not shown) on the under side of the drum and drive unit engage slots 60 in locking arms 53 and 54 to prevent the unit being withdrawn when the optical scanning unit 32 is in any position other than the "start" position even though lever 21 be inadvertently set to release the unit.

Figures 7, 8:
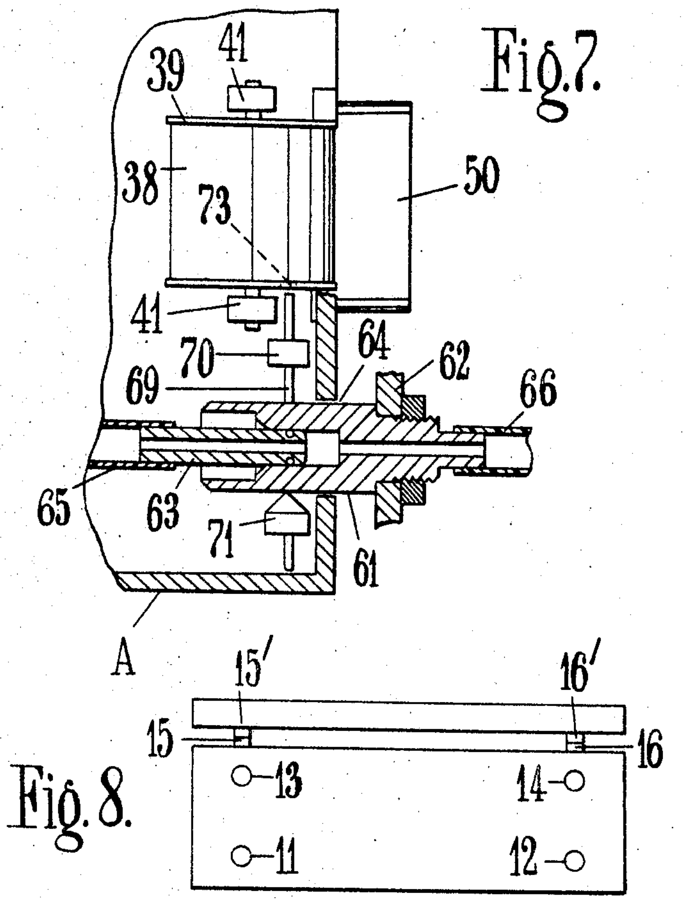
FIGURE 7 shows details of a blind locking device and a pneumatic union.
FIGURE 8 is a schematic diagram showing positions of buffers and stops.

It will be seen that when the drum and drive unit is removed from the main assembly it is necessary to break the air link supplying the two air bearings supporting the drum shaft 8. For this purpose, a pneumatic socket is provided which is indicated in FIGURE 7 by reference numeral 61. Socket 61 is rigidly attached to a bracket 62 forming part of the main assembly. A plug 63 is rigidly attached to a part (not shown) of the drum and drive assembly a portion of which is shown at A. Thus, when the drum and drive unit is slid into position, socket 61 passes through hole 64 in the drum and drive unit and plug 63 enters the socket 61. An elastic O-ring near to the tip of plug 63 effectively seals the union against escape of air. Plastic tube 65 attached to plug 63 feeds the air bearings through two branches (not shown) while plastic tube 66 attached to socket 60 is connected to spring loaded stop valve 67 (see FIGURE 1). A cam-shaped part 68 of extension 22 closes stop valve 67 to cut off the air supply to the air bearings when lever 21 is operated to the "release" position as shown in FIGURE 4.

A further feature of the invention is to lock blind 38 in the "start" position when the drum and drive assembly is removed from the machine. This is achieved in the following manner. Referring to FIGURES 2 and 7 a light metal rod 69 is mounted in guides 70 on the drum and drive unit. The lower part of rod 69 is U-shaped and carries at its extremity a conical part 71. Rod 69 is biased upwardly by a spring 72. It is arranged that when the blind 38 is in the "start" position a hole 73 in the lower flange of drum 39 is in register with the vertical part of rod 69. It is further arranged that the conical part 71 is in horizontal alignment with pneumatic socket 61 and the apex thereof is slightly higher than the lowest part of socket 61 as shown in FIGURE 2. Thus, it can be seen that when the drum and drive unit is removed the spring 72 will urge rod 69 into hole 73 in drum 39 thereby locking it in the drive position. But, when the drum and drive unit is replaced, rod 69 will be depressed by the engagement of conical part 71 with pneumatic socket 61, as shown in FIGURE 7, thereby unlocking drum 39.

The above description relates to a facsimile receiver embodying the various features of the invention.

A co-operating fascimile transmitter is similar with the exception that the light-tight container enclosing the drum 1 is in this case, not required, and consequently the related parts may be omitted.

While a form of invention adapted to high speeds has been herein described it will be readily apparent that various modifications may be made and the device adapted to other and lower speed equipment without departing from the scope of the invention.

I claim:

1. Photo-telegraphic apparatus comprising a frame, air bearings mounted in the said frame, a shaft mounted in the said air bearings, a cylindrical drum mounted on the shaft for rotation about its own axis, a motor adapted to be mounted in the frame, drive means drivably interconnecting the motor and shaft, scanning means mounted on the frame, means for causing the scanning means to traverse the drum in a direction longitudinal thereof, the air bearings, shaft, drum, motor and driving means being arranged as a sub-assembly removable from the frame, and means for securing the sub-assembly on the frame.

2. Photo-telegraphic apparatus as claimed in claim 1, comprising an air supply system for said bearings, said air supply system including a first conduit fixed on the frame, a second conduit in the sub-assembly and a readily detachable union arranged to connect the said conduits when the sub-assembly is mounted on the frame.

3. Photo-telegraphic apparatus as claimed in claim 2, in which the air supply system further includes an air flow control valve, means being provided to close the said control valve when the means for securing the sub-assembly on the frame is released.

4. Photo-telegraphic apparatus as claimed in claim 1, comprising stop means for locating the sub-assembly accurately in the frame in relation to the path of the scanning means.

5. Photo-telegraphic apparatus as claimed in claim 4, comprising co-operating guide means on the frame and sub-assembly for guiding the sub-assembly toward accurate location on the frame.

6. Photo-telegraphic apparatus as claimed in claim 5, in which the guide means on the frame comprise chamfered grooves, and the guide means on the sub-assembly comprise inverted channel members adapted to enter the said chamfered grooves and slide therein.

7. Photo-telegraphic apparatus as claimed in claim 1, further comprising blocking means for inhibiting movement of the sub-assembly when the scanning means is displaced from a start position.

8. Photo-telegraphic apparatus as claimed in claim 7, in which the blocking means comprises blocking arms spring-urged towards a position in which they block movement of the sub-assembly into position on the frame and having an abutment movable therewith, means being provided on the scanning means for engaging the said abutment to move the said blocking arms out of blocking position as said scanning means is moved into start position.

9. Photo-telegraphic apparatus as claimed in claim 8, in which the blocking arms comprises means to inhibit removal of the sub-assembly from the frame when the scanning means is out of the start position.

10. A photo-telegraphic receiver comprising a frame, a light-tight container arranged to be mounted on the frame, air bearings mounted in the light tight container, a shaft mounted in the air bearings, a cylindrical drum carried on the shaft for rotation about its own axis, a motor adapted to be mounted on the frame, drive means interconnecting the motor and drum, scanning means mounted on the frame, means for causing the scanning means to traverse the drum in a direction longitudinal thereof, the said container having a slot therein and a blind movable with the scanning means sealing said slot against ingress of light, the blind including an aperture through which the scanning means may be introduced into the light-tight container in a light-tight manner, the light-tight container, air bearings, shaft, drum, motor and drive means being arranged as a sub-assembly removable from the frame, and means for securing the sub-assembly to the frame.

11. A photo-telegraphic receiver as claimed in claim 10, in which the aperture in the blind is sealable by shutters adapted to be opened by engagement with the scanning means as the sub-assembly is moved towards correct location in the frame, the blind including a shroud around the aperture and the scanning means having a shroud adjacent the part thereof engageable with the shutters, the shrouds being co-operable to form a light seal before the scanning means opens the shutters.

12. A photo-telegraphic receiver as claimed in claim 10, further comprising blocking means for inhibiting movement of the sub-assembly when the scanning means is displaced from a start position.

13. A photo-telegraphic receiver as claimed in claim 12, in which the blocking means comprises blocking arms spring-urged towards a position in which they block movement of the sub-assembly into position on the frame and having an abutment movable therewith, means being provided on the scanning means for engaging the said abutment to move the said blocking arms out of blocking position as said scanning means is moved into start position.

14. A photo-telegraphic receiver as claimed in claim 12, comprising a pair of reels located one adjacent each end of the light-tight container and arranged to coil and uncoil the ends of the blind as the latter moves longitudinally of the container, and means for retailing one of said reels in the position corresponding to a start position of the scanning means when the sub-assembly is separate from the frame.

15. A photo-telegraphic receiver as claimed in claim 14, comprising an air supply system for the air bearings including a first conduit fixed to the frame, a second conduit fixed in the sub-assembly and a readily detachable union arranged to connect the conduits with the sub-assembly is mated on the frame, the part of the union fixed in the frame being arranged to engage the reel retaining means during assembly of the sub-assembly onto the frame to retract the same from reel retaining position.

References Cited by the Examiner

UNITED STATES PATENTS

| | | | |
|---|---|---|---|
| 2,120,989 | 6/38 | Pfannenstiehl | 178—7.4 |
| 2,523,400 | 9/50 | Thompson | 178—6.7 |

DAVID G. REDINBAUGH, *Primary Examiner.*